INVENTORS
ROBERT S. CHAMBERLIN,
CLIFFORD M. ORR, AND
EWALD F. SCHMITZ
BY
ATTORNEY

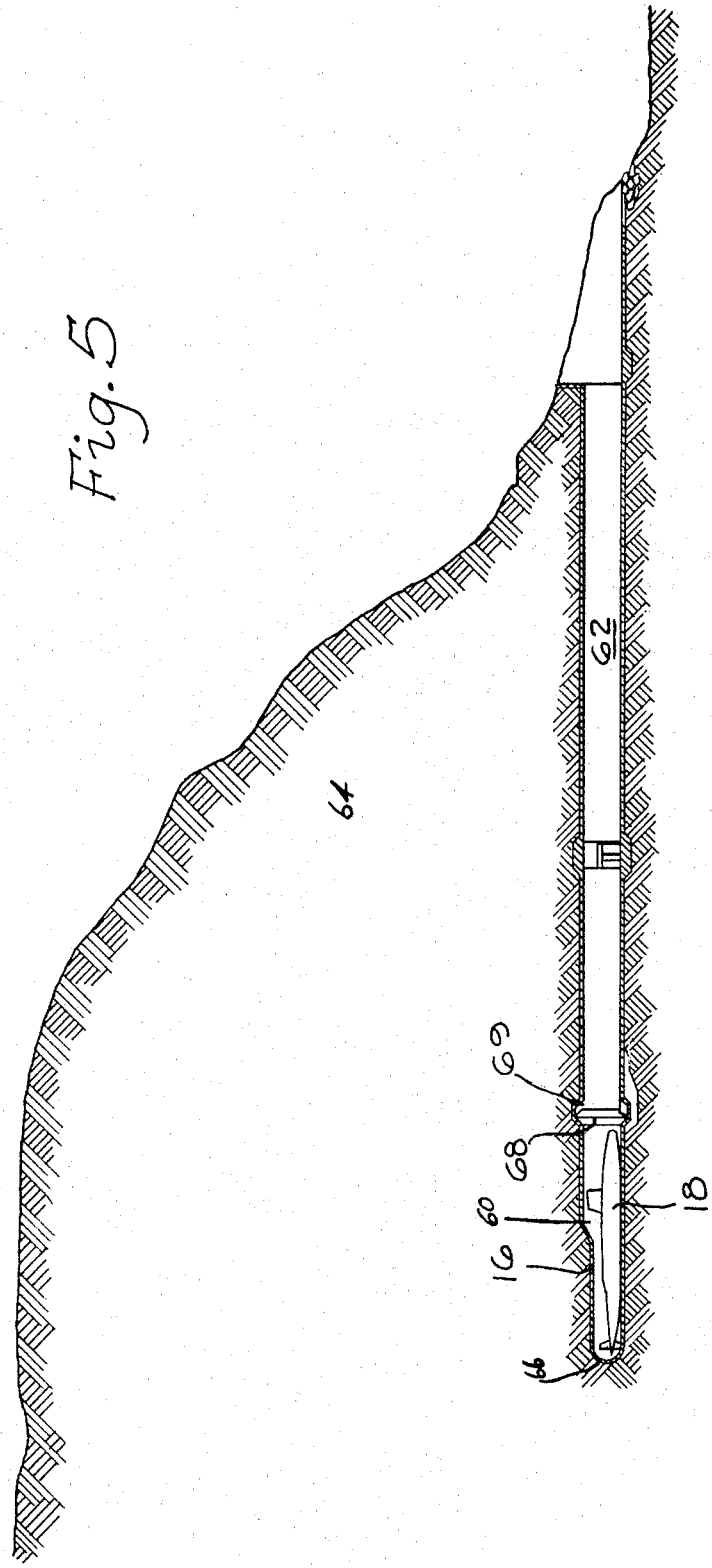

United States Patent Office 3,453,879
Patented July 8, 1969

3,453,879
SYSTEM OR APPARATUS FOR SIMULATING SUBMARINE TESTING CONDITIONS
Robert S. Chamberlin and Clifford M. Orr, Western Springs, and Ewald F. Schmitz, La Grange Park, Ill., assignors, by mesne assignments, to the United States of America as represented by the Secretary of the Navy
Filed June 21, 1967, Ser. No. 649,418
Int. Cl. G01m *10/00*
U.S. Cl. 73—148       1 Claim

ABSTRACT OF THE DISCLOSURE

A vessel is provided having the physical characteristics to be maintained under high pressures and of such size and shape as to readily enclose a submarine. The vessel is located in a large fabricated chamber containing water and is provided with a movable closure which permits the submarine to move into the vessel when the closure is in open position and permits the vessel to be pressurized when the closure is in closed position for the purpose of pressure testing the submarine.

---

This invention relates to submarine testing and in particular is concerned with testing a submarine within a pressure chamber which is located in a confined water environment and arranged to provide the actual test diving conditions which are encountered in submarine testing in a natural body of water.

The pressure vessel may be located in a confined zone such as a fabricated dry dock adjacent a body of water which is equipped with water pumping or distribution facilities or the confined zone may be an underground reinforced cavern or tunnel which is formed in the side of a river bank and equipped with water pumping or distribution facilities for the supply of water to the confined area.

The pressure vessel will be of cyindrical shape and may be variously formed to have a uniform diameter but preferably will have a portion of a smaller diameter which merges with a portion having a larger diameter to assume the general outline of present day submarines. The pressure vessel will be sufficiently large to provide an enclosure for a submarine; will contain a body of pressurizing water, and it may be formed of a single or multiple walls.

In order to permit the maneuvering of a submarine into and out of the pressure vessel it is necessary to provide the pressure vessel with a movable closure which also may be variously constructed. The closure may be a single unit structure or segmented and may be mounted about a vertical axis for movement in a horizontal plane or mounted about a horizontal axis for movement in a vertical plane and the movement of the closure may be accomplished by any power means which is available or suitable.

For a better understanding of the invention, reference should be had to the following detailed description read in conjunction with the drawings wherein:

FIGURE 5 is a view in partial vertical section showing a pressure chamber formed in an underground reinforced cavern or tunnel.

Figure 1:
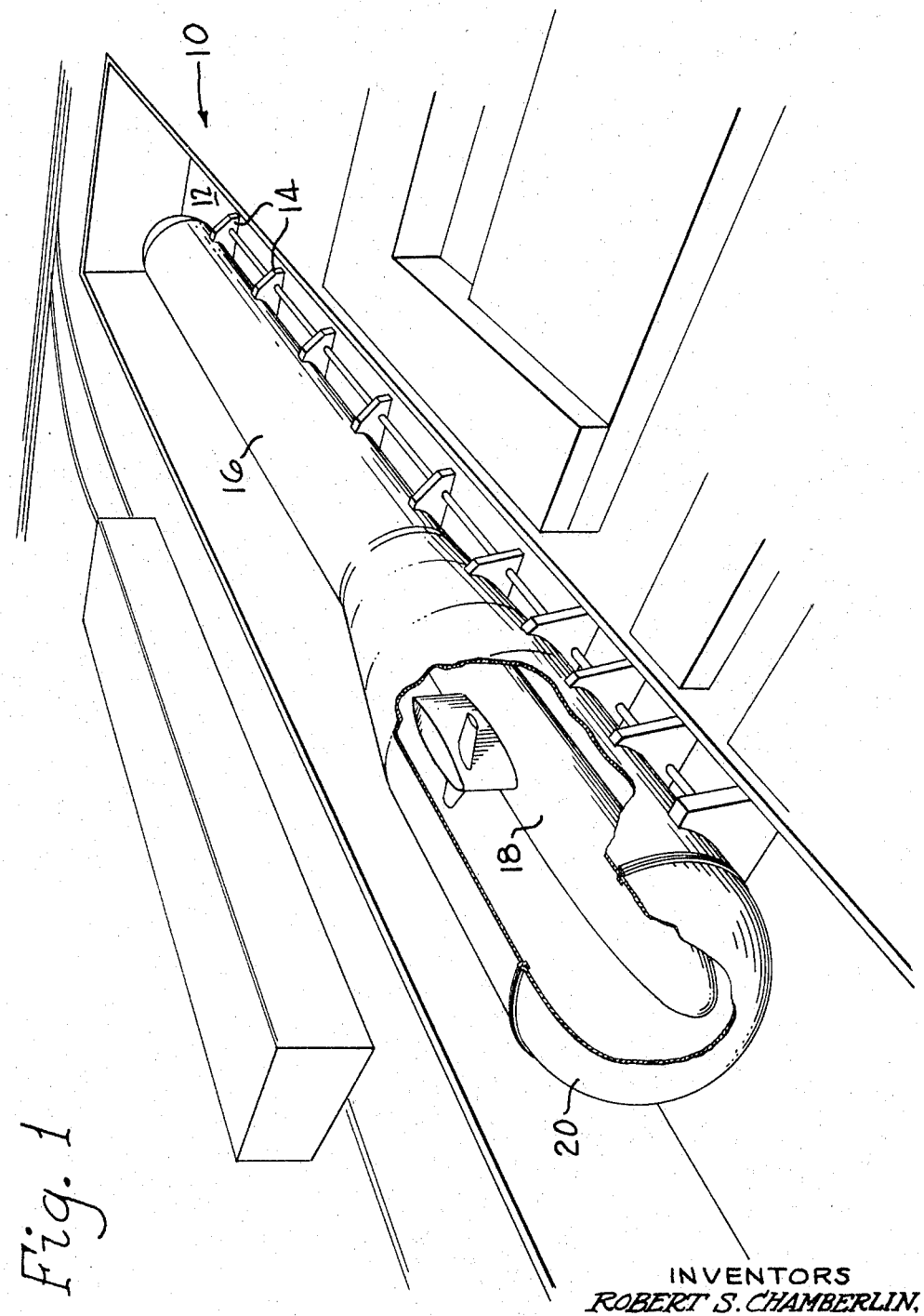
FIGURE 1 is a perspective view of a cylindrical pressure vessel and closure assembly supported in a dry dock and having a portion broken away to show an enclosed submarine.

In FIGURE 1, a dry dock indicated at 10 is formed with side and end walls to provide a large open chamber for containing water and has a base 12 with a number of cradles 14 spaced therealong to support a pressure vessel which is shown at 16 and extends generally parallel with the base 12. The pressure vessel 16 is shaped generally as shown with an enlarged diameter front portion to adapt it for the ready reception of a submarine indicated at 18 which is provided with the usual conning tower structure. The pressure vessel 16 is provided with a closure 20 which is preferably of hemispherical shape as shown and will be arranged to be movable for admitting a submarine which is to be tested to the pressure vessel and to close the vessel 16 when it is to be pressurized. For this purpose, the closure will be provided with suitable clamping means for securement to the vessel and sealing means will be provided but such details are not shown as they are considered unnecessary for the purpose of this invention.

It will be understood, although not shown, in the drawings, that water will be supplied, for example, from a river source to the dry dock 10 for the purpose of pressurizing the vessel 16 and the dry dock will be sufficiently large to permit maneuvering the submarine into the vessel when a test is to be carried out. It will also be understood that the vessel 16 and closure 20 will involve extremely large structures and weight factors since the assembly will enclose a full size submarine and these factors will require substantial engineering in order to provide the best equipment for testing a submarine under conditions which simulate actual testing of a submarine in a natural body of water.

Figure 2:
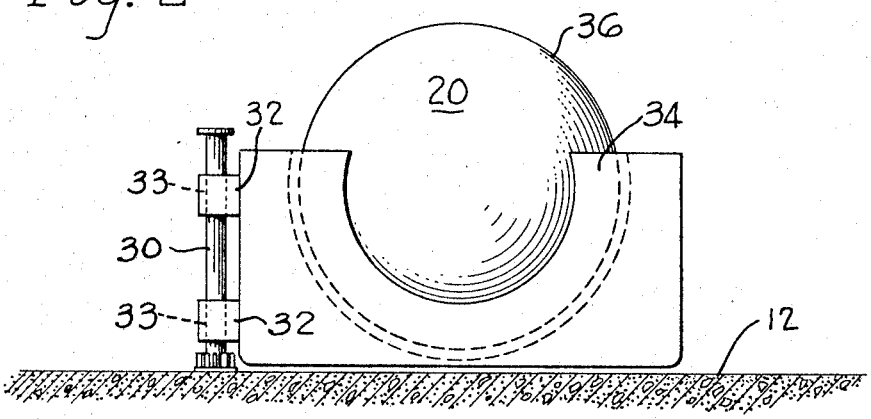
FIGURE 2 is a view in front elevation showing the closure of FIGURE 1 mounted by weight supporting structure for pivotal movement in a horizontal plane.

In FIGURE 2 the closure 20 of FIGURE 1 is mounted for movement in a horizonal plane. For this purpose a vertical hinge post 30 is fixedly secured on the dry dock floor 12 and a plurality of connectors 32, which are formed integrally with a door supporting structure 34, provide bearings 33 which embrace the vertical post 30. The door supporting structure 34 may comprise a rectangular float structure to, as shown, embrace the lower half of the closure 20 and extend beyond the outer periphery 36 of the closure. The purpose of the float 34 is to provide buoyancy for the closure and although not shown in the drawings, it will have considerable thickness and be provided with suitable reinforcing ribs depending on the buoyant material selected for constructing the float in order to develop the requisite rigidity.

Figure 3:
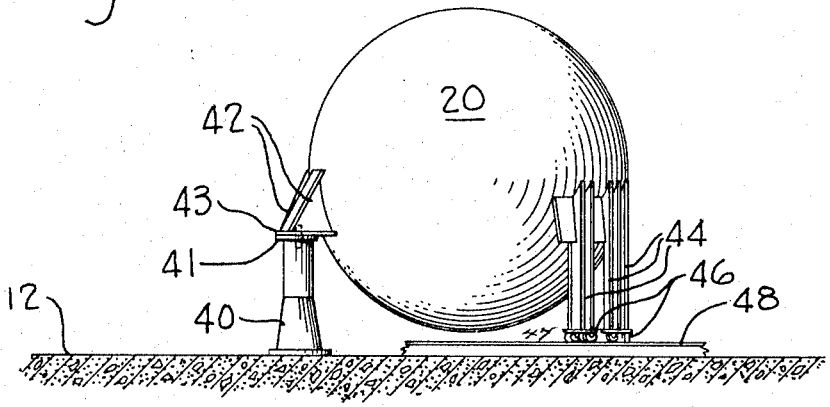
FIGURE 3 is view similar to FIGURE 2 but showing another type of weight supporting structure.

In FIGURE 3, the closure 20 of FIGURE 1 is also supported for movement in a horizontal plane by the utilization of a vertical hinge post indicated generally at 40 which is also fixedly supported on the floor 12 of the dry dock 10 and has a bearing plate 41 at its upper end. Arms 42 are secured at their upper ends to the closure 20 and support a bearing plate 43 at their lower ends which provides a bearing surface with the plate 41 of the hinge post 40 for movement of the closure 20. A plurality of vertical supports which are shown in the form of vertical plates 44 have their upper ends secured to the closure 20 in a line which is generally opposite the line of securement of the hinge arms 42 with the closure. The vertical posts 44 are shown in spaced pairs which carry at their lower ends a set of rollers 46 which are mounted on horizontal plates 47 and supported on a roller bed 48. The bed 48 is supported on the floor 12 of the dry dock and may be provided with guide tracks for receiving the rollers 46.

The closure float assembly of FIGURE 2 and the roller support assembly of FIGURE 3 will function to reduce the energy required in moving the closure 20 between its open and closed positions. In practice this will be accomplished preferably by the application of force to the closure 20 at a location generally opposite the vertical hinge connections.

Figure 4:
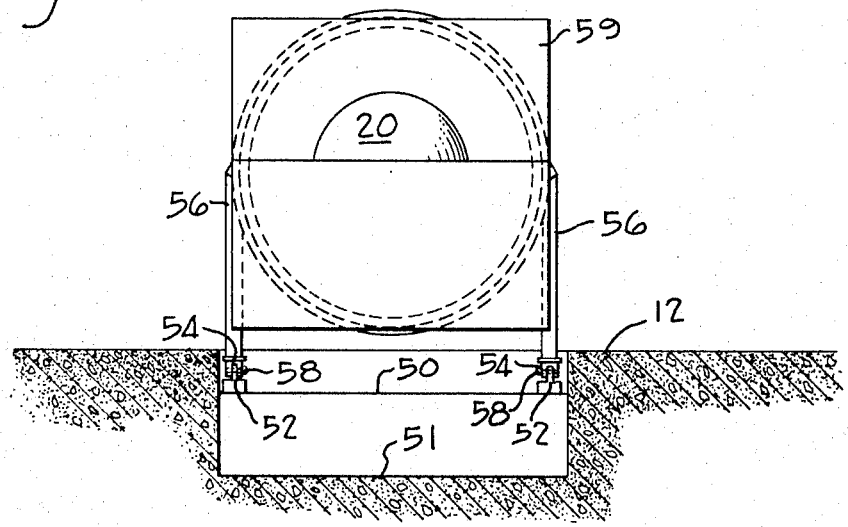
FIGURE 4 is view in front elevation showing the closure of FIGURE 1 mounted by another modification of the weight supporting structure for pivotal movement in a vertical plane.

In FIGURE 4, the closure 20 of FIGURE 1 is supported for movement in a vertical plane. For this purpose the floor 12 of the drydock 10 will be recessed to provide a stepped section 50 immediately below the closure 20 and a well section 51. The stepped section 50 fixedly receives supports 52 which mount the lower halves 52 of a pair of multiple leaf hinges. The upper halves 54 of the hinges are fived to the lower ends of legs 56 which are in turn secured at opposite points generally midway of the periphery of the closure 20 and, as shown, the hinge sections 52 and 54 are connected by pintles 58. The closure 20 will then be provided with a buoyant float structure 59 which, as shown, may be rectangular and enclose the closure 20.

In FIGURE 5, the pressure chamber is identified at 60 and is located at the inner end of a tunnel 62 which is formed in a river bank 64. The pressure chamber 60 is defined by the rear end 66 of the tunnel and a closure indicated generally at 68 which is disposed in an enlarged zone 69 formed in the tunnel. In this modification the portion of the tunnel forwardly of the closure 68 will be considered the equivalent of the dry dock 10 of FIGURE 1 and water will be supplied from the adjacent river, not shown, for the purpose of maneuvering the submarine 18 into the pressure chamber 60 and for pressurizing the chamber when the closure is in sealed position.

Figure 6:
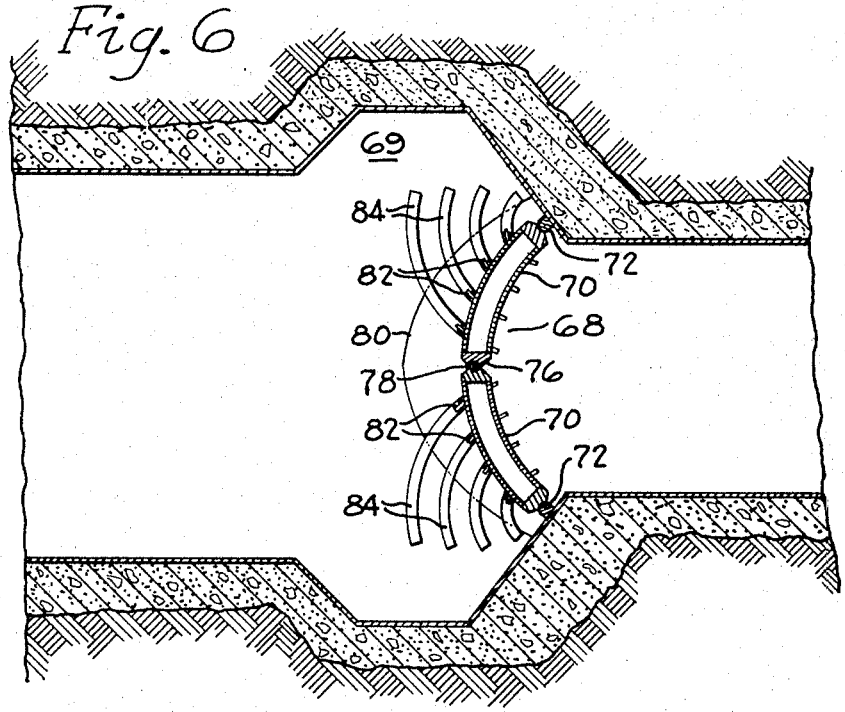
FIGURE 6 is an enlarged top plan view of a portion of FIGURE 5 showing details of a segmented or sectional type of closure having weight supporting means attached.

In FIGURE 6, the closure 68 of FIGURE 5 is formed of two similar arch type metal sections 70 which will be constructed in a manner to be able to withstand the pressures existing in the pressure chamber 60. The sections are shown in their closed position and in order to seal the closure, sealing strips 72 may be attached to the inner face of the enlarged zone 69 and positioned to contact the top, bottom and side peripheral edges of each section. In order to seal the inner peripheral edges 76 of the sections a seal strip 78 may be attached to one of these edges. A plate 80 is located at the bottom of the enlarged zone 69 and provides a support for the closure sections 70 through a plurality of rollers 82 which extend from the sections as shown. In order to guide the sections, the plate 80 has a pluarlity of arcuate guide tracks 84 which are spaced to mate the rollers 82 and guide the movement of sections 70 between their open and closed positions. It will be understood that a roller and guide track arrangement may and probably will be provided at the upper ends of the closure sections 70. Although, not shown, movement of the sections 70 in the guide tracks 84 from their shown closed positions will be accomplished by the application of force adjacent the inner peripheral edges 76 of the section.

Obviously many modifications and variations of the present invention are possible in the light of the above teachings. It is therefore to be understood that the invention may be practiced otherwise than as specifically described.

We claim:
1. A system for simulating actual water pressure conditions for testing a submarine which comprises:
 a drydock containing a body of water for enabling maneuvering of a submarine therein;
 an elongated cylindrical pressure vessel fixedly positioned in the drydock essentially parallel with the base of the drydock, said pressure vessel having a closed end and an open end sufficiently large to enable passage of the submarine therethru; and
 closure means including means for sealing said open end comprising a pair of similar sections pivotally mounted to the pressure vessel for movement essentially in the horizontal plane, each section having rollers extending therefrom for movement in tracks carried by the vessel.

References Cited
UNITED STATES PATENTS

| | | | |
|---|---|---|---|
| 1,309,728 | 7/1919 | Grieshaber | 73—148 |
| 1,309,736 | 7/1919 | Hibbs et al. | 73—148 |
| 1,436,427 | 11/1922 | Banks | 220—30 |
| 1,764,903 | 6/1930 | Spear | 73—148 XR |
| 3,326,002 | 6/1967 | Halpenny | 61—28 |

LOUIS R. PRINCE, *Primary Examiner.*

JEFFREY NOLTON, *Assistant Examiner.*

U.S. Cl. X.R.

61—28